United States Patent [19]

Kadotani et al.

[11] Patent Number: 5,559,924
[45] Date of Patent: Sep. 24, 1996

[54] RADIANT FLUID HEATER ENCASED BY INNER TRANSPARENT WALL AND RADIATION ABSORBING/REFLECTING OUTER WALL FOR FLUID FLOW THERE BETWEEN

[75] Inventors: Kanichi Kadotani; Kazuhiko Kubota; Mitsuru Ohaku, all of Hiratsuka, Japan

[73] Assignee: Kabushiki Kaisha Komatsu Seisakusho, Tokyo, Japan

[21] Appl. No.: 98,314

[22] PCT Filed: Jan. 29, 1992

[86] PCT No.: PCT/JP92/00086

§ 371 Date: Aug. 5, 1993

§ 102(e) Date: Aug. 5, 1993

[87] PCT Pub. No.: WO92/14102

PCT Pub. Date: Aug. 20, 1992

[30] Foreign Application Priority Data

Feb. 8, 1991 [JP] Japan ................. 3-039203
Mar. 29, 1991 [JP] Japan ................. 3-027818
Jun. 13, 1991 [JP] Japan ................. 3-168738

[51] Int. Cl.⁶ ........................................ F24H 1/10
[52] U.S. Cl. ............................................. 392/483
[58] Field of Search ........................ 392/483, 482, 392/480, 393, 391; 122/13.1, 13.2; 165/156, 154, 172, 186, 181

[56] References Cited

U.S. PATENT DOCUMENTS 1,767,122 6/1930 Dean .................................. 392/483
2,589,566 3/1952 Neth et al. ......................... 392/483
4,797,535 1/1989 Martin ................................ 392/483
5,054,107 10/1991 Batchelder ......................... 392/483
5,271,086 12/1993 Kamiyama ......................... 392/480

FOREIGN PATENT DOCUMENTS

84881    8/1983  European Pat. Off. ............. 392/483
867504  11/1941  France ............................. 392/483
875054   9/1942  France ............................. 392/483
39-2664  2/1964  Japan .
40-712   1/1965  Japan .
61-116246 6/1986 Japan .
2-55047  4/1990  Japan .
1009405  4/1983  U.S.S.R. .......................... 392/483
563945   9/1944  United Kingdom ................ 392/483

*Primary Examiner*—John A. Jeffery
*Attorney, Agent, or Firm*—Richards, Medlock & Andrews

[57] ABSTRACT

A fluid heater, capable of having a high energy density structure with an increased radiation receiving area, facilitating maintenance services and preventing intrusion of contamination substances, comprises a transparent internal pipe (11) which is open-ended at both ends and is positioned within an external pipe (12) of a fluid heating pipe unit (1). The fluid heating pipe unit (1) is provided with a fluid inlet (31) and a fluid outlet (32). The adjacent ends of the external pipe (12) and internal pipe (11) are connected to each other and sealed, and an electrical radiant heater (2) is arranged within the internal pipe (11) with a space (7) left therebetween. The ends of the electric heater (2) are removably supported by positioning members (91, 92). An inwardly directed radiation reflecting surface (12b) and/or a radiation absorbing material (12c) can be provided as part of the external tube (12).

14 Claims, 12 Drawing Sheets

RADIANT FLUID HEATER ENCASED BY INNER TRANSPARENT WALL AND RADIATION ABSORBING/REFLECTING OUTER WALL FOR FLUID FLOW THERE BETWEEN

TECHNICAL FIELD

The present invention relates to a fluid heater for resonance-heating a fluid to be heated by radiant heat. More particularly, the invention relates to a fluid heater capable of appropriately carrying out heating and temperature control, such as heating and temperature control of etching solution and resist removing solution after cleaning wafers made of silicon or the like in processes for manufacturing semiconductor devices, and heating and temperature control of oils for foodstuffs while the fluid to be heated is being supplied.

BACKGROUND ART

Figure 10:
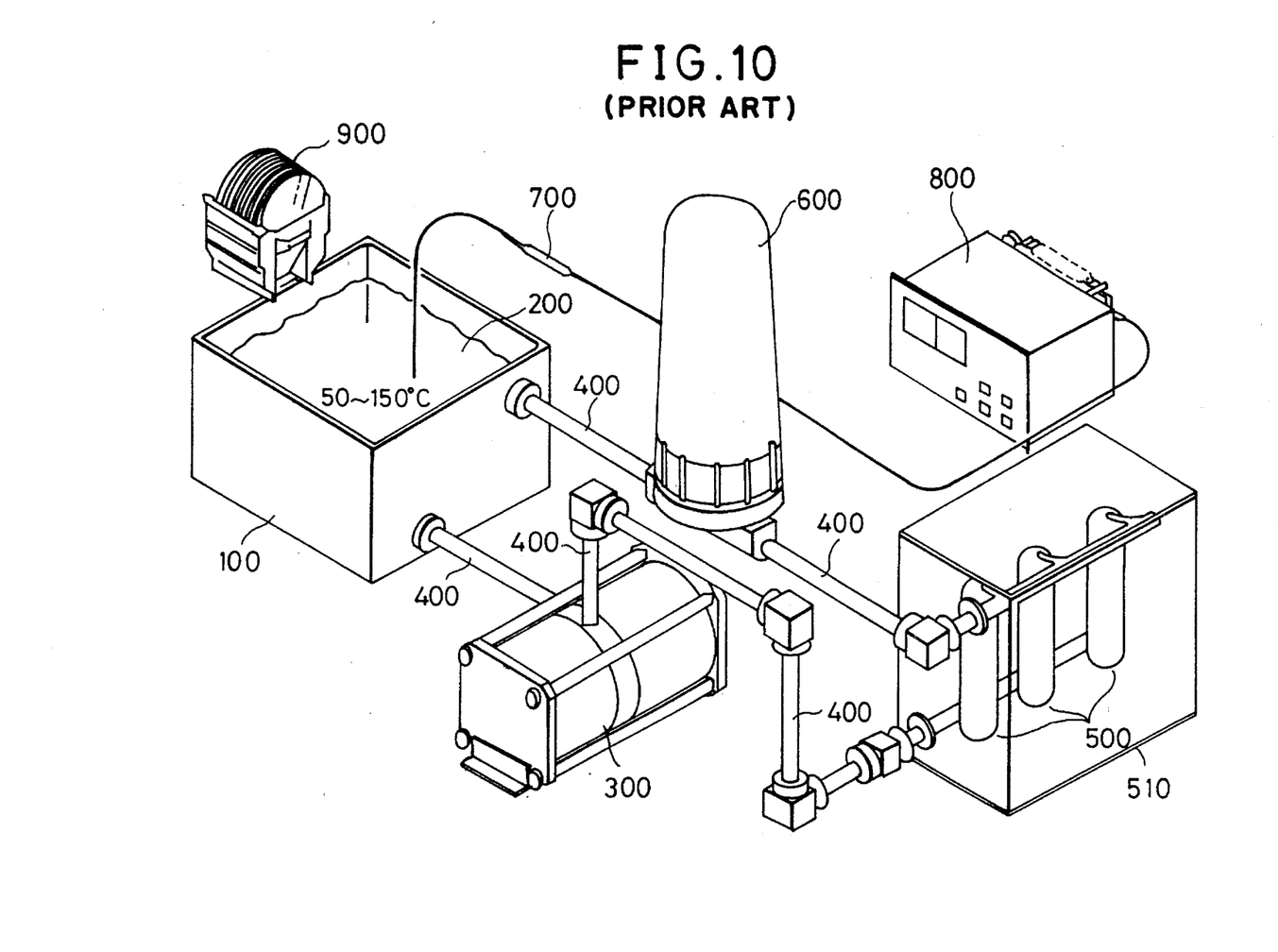
FIG. 10 is a perspective view showing an example of appropriate use of the fluid heater.

An example of an appropriate use of a fluid heater is described with reference to a temperature control unit for a semiconductor wafer treating solution shown in FIG. 10. In FIG. 10, a treating bath 100 is filled with treating solution 200. The treating solution 200 is forced to flow in a teflon piping 400 by a pump 300, heated by a fluid heater 500, filtered by a filter 600 to remove foreign substances contained in the treating solution, and returned to the treating bath 100. The temperature of the treating solution 200 in the treating bath 100 is detected by a sensor 700, and the controller 800 controls the fluid heater 500 so that the detected temperature approaches a preset temperature. In FIG. 10, numeral 510 denotes a box which incorporates the fluid heater 500, and numeral 900 denotes semiconductor wafers.

Figure 11A:
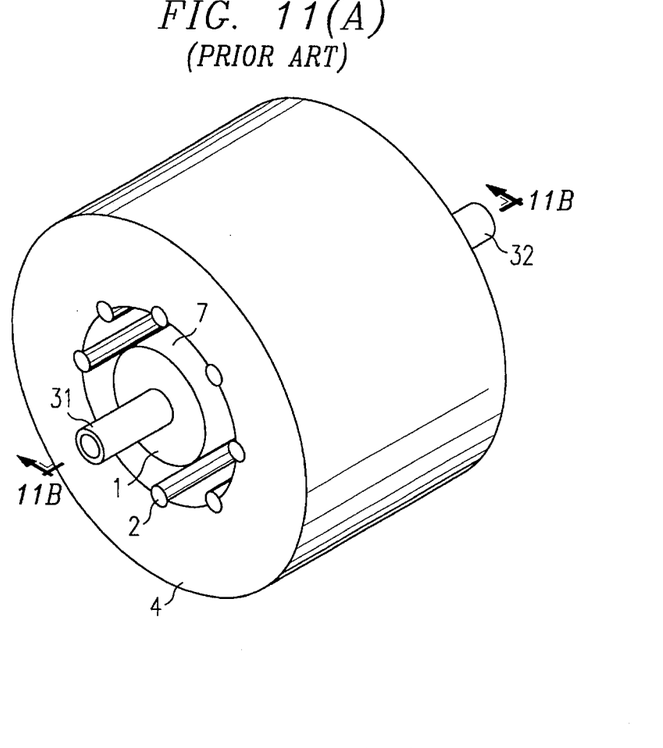
FIG. 11(A) is a perspective view of a conventional fluid heater and FIG. 11(B) is a sectional view along line 11B—11B of the fluid heater of FIG. 11(A).
Figure 11B:
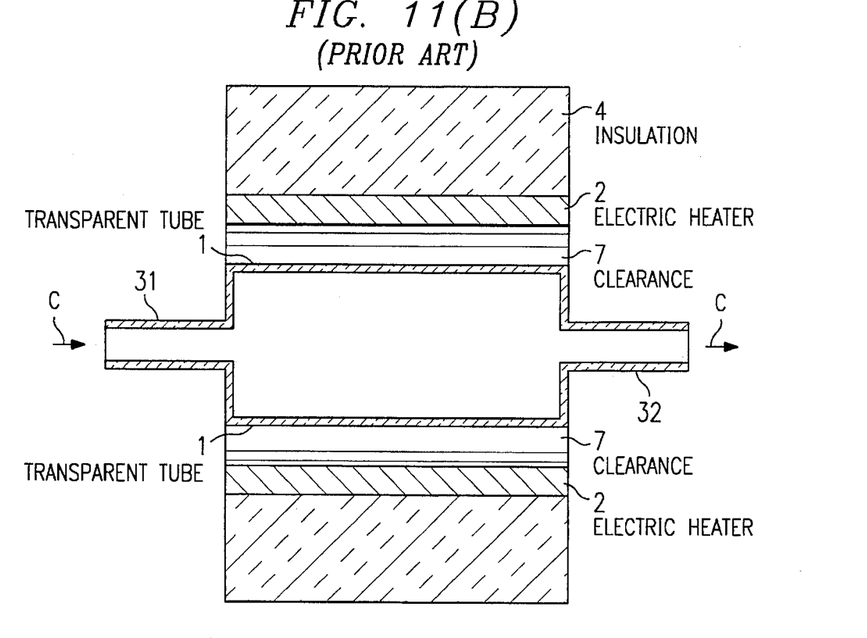

FIGS. 11(A) and 11(B) are respectively a perspective view and a sectional view of a conventional fluid filter. Specifically, a plurality of electric heaters 2 are provided on an external periphery of a fluid heating pipe unit 1 to heat fluid C introduced from an inlet pipe 31 and discharged through an outlet pipe 32. In this example, the fluid heater 2 comprises, in order from the inside, a fluid heating pipe unit 1, a clearance 7, an electric heater 2 formed with eight parallel members such as nichrome wire, kanthal wire and others, and insulation material 4.

In this case, the above described conventional fluid heater includes a problem as described below. The fluid heater heats fluid by radiant heat and, in this case, a temperature increasing rate of fluid to be heated by radiant heat is proportional to an energy density of absorption wavelength band of heated fluid (penetration energy in a unit time in a unit area) if a radiation area is fixed, and is proportional to the radiation area if the energy density is fixed. In other words, the energy density needs to be increased or the radiation area needs to be expanded in order to raise the heating rate.

By the way, the higher the temperature of the electric heater 2 is, the higher the energy density can be increased according to the Stefan-Boltzmann law. However, unless the energy is absorbed only by the fluid heating pipe unit 1 when the electric heater 2 is set to a high temperature, the temperature of the electric heater 2 rises, resulting in melting loss. Otherwise, even though the radiation area is expanded by increasing the number of members of the electric heater 2, the electric heater 2 is short-circuited, resulting in melting loss. In addition, part of the radiant heat is radiated outwardly from the external periphery of the electric heater 2 and absorbed by the insulation material 4 and therefore it does not contribute to the heating of the fluid.

On the other hand, the radiation area can be expanded to raise the heating rate but a larger fluid heating pipe unit 1 is required and the fluid heater needs to be a larger size. It is difficult to conduct heat to the portion of the fluid which flows in the central part of the fluid heating pipe unit 1, and consequently the heating rate is not raised.

Particularly in manufacturing semiconductor wafers, chemical solutions such as super-aqua-ammonia, sulfuric acid, hydrochloric acid and hydrofluoric acid are heated up to approximately 50°–150° C. in the fluid heater 500 for use in cleaning, etching and removing resist, but technologies in relation to corrosion resistance of the fluid heater 500 and a low degree of contamination of heated chemical solution are unknown.

For example, an embodiment disclosed in the Patent Application Disclosure No. 116246-1986 is a fluid heater differing from the above described prior art. Though not shown, the configuration of this embodiment is such that a fluid heating pipe unit is provided on the external periphery of the electric heater. Specifically, this fluid heater comprises an electric heater serving as an infrared radiation member and crystal glass forming an internal pipe of the fluid heating pipe unit which are integrated. In such configuration, when the infrared radiation member is to be replaced, substances adhering to new components are brought into the passage. For cleaning new components, the passage is exposed to the outside and there is a possibility of foreign substances which may intrude into the passage from an external atmosphere even though new components are cleaned. A treating solution for wafers made of silicon or the like in semiconductor device manufacturing process needs to be filtered in a clean room to remove foreign substances contained in the solution, and therefore work accompanying intrusion of foreign substances into the passage should be avoided. In addition, a chemical solution always leaks whenever the fluid heater is mounted and demounted, and the leakage can adhere to other components and an operator's body to result in a cause of corrosion and hazard to health. To prevent such leakage, the chemical solution should be removed in advance from the fluid heating pipe unit, which is a troublesome work. Fluids for etching and removing the resist are contaminated due to stains of devices after repeated use and therefore should be periodically renewed by replacing them with fresh fluids. In this case, the internal tube of the fluid heating pipe unit, which has a high temperature, is directly exposed to a low temperature unheated fluid and thus is subjected to a large thermal impact, and this will therefore be a cause of remarkable reduction of the service life. This tendency is further increased in the configuration shown in FIGS. 11(A) and 11(B). In other words, the electric heater 2 surrounded by insulation material 4 maintains a high temperature for a long time even after the current supply has been stopped. The inventors of the present invention have confirmed that, if fluid C is removed and new unheated fluid C is introduced into the heating pipe, this new fluid C is boiled on the surface of the heating pipe 1 to produce a great volume of vapor and the fluid heating pipe unit 1 would be broken by thermal impact due to boiling and vapor pressure.

DISCLOSURE OF THE INVENTION

The first object of the present invention made in view of the above described problems of the prior art is to provide a fluid heater which has a high energy density structure and an increased radiation receiving area. In addition, the second object is to provide a fluid heater which facilitates maintenance services and excels in prevention of intrusion of contamination sources.

To attain the above first object, the fluid heater in accordance with the present invention can have a fluid heating pipe unit, which is made of a transparent member, provided on the external periphery of the electric heater and an inwardly faced reflection member provided on the external periphery of this fluid heating pipe unit.

Alternatively, the fluid heating pipe unit provided on the external periphery of the electric heater can be constructed with a transparent member at the electric heater side and an inwardly faced reflection member as the external side.

In addition, this fluid heating pipe unit can be formed with a radiant heat absorbing member between the outside of the fluid heating pipe and the inwardly faced reflection member.

Moreover, the electric heater can be U-shaped and the fluid heating pipe unit can be formed in a semispherical shape in which a reflector plate is provided and this U-shaped electric heater can be housed in a concaved space of the semispherical fluid heating pipe unit.

The reflection surface of the inwardly faced reflection member on the outside of the fluid heating pipe unit and the reflection surface of the inwardly faced reflection member provided on the external periphery of the radiant heat absorbing member are formed with a light reflective film made of gold, aluminum, tin oxide, indium, or chromium.

To attain the above second object, the fluid heater in accordance with the present invention has an electric heater which is a quartz glass tube type infrared ray heater, a fluid heating pipe unit which consists of a transparent quartz glass tube at the electric heater side and a fluororesin tube, which is a radiant heat absorbing member at the external side, whereby both ends of this quartz glass tube are fitted into holes provided in both end closing walls of the fluororesin tube. The cross section of the external profile of the fluid heating pipe unit can be polygonal.

The fluid heater is arranged in a housing, which can be inwardly covered with a light reflection film made of gold, aluminum, tin oxide, indium or chromium.

In the structure as described above, radiant heat from the electric heater is basically radiated to the fluid heating pipe unit to heat fluid. Fluid penetrating radiant heat, which has not contributed to the initial heating of the fluid, penetrates the outside of the fluid heating pipe unit and is reflected by the inwardly faced reflection member which is externally provided in an annular shape, then penetrates again the outside of the fluid heating pipe unit to be re-radiated into the fluid, whereby the fluid is further heated.

Fluid penetrating radiant heat is reflected into the fluid without penetrating the outside of the fluid heating pipe unit to further heat the fluid when the outside of the fluid heating pipe unit is formed as the inwardly faced reflection member. When fluid penetrating radiant heat is absorbed by the radiant heat absorbing member on the outside of the fluid heating pipe unit, the absorbed radiant heat subsequently further heats the fluid as conduction heat.

Since the fluid heating pipe unit is formed with anticorrosive materials which are a quartz glass tube and a fluororesin tube, the anticorrosiveness of the fluid heating pipe unit and the low contaminativeness of fluid to be heated are improved. The electric heater formed as a quartz glass type infrared ray heater withstands high temperatures, and maintainability is improved.

In addition, the reflection surface of the inwardly faced reflection member or the reflection surface of the inwardly faced reflection member provided on the external periphery of the radiant heat absorbing member is formed as a light reflection film made of gold, aluminum, tin oxide, indium or chromium to prevent leakage of the penetrating radiant heat and to reflect the radiant heat into the fluid, thus making the radiant heat further contribute to the heating of the fluid.

Moreover, an internal pipe of a transparent fluid heating pipe unit, which is open-ended at both ends, can be disposed in an external pipe of a fluid heating pipe unit, which is provided with a fluid inlet and a fluid outlet in the pipe wall and open-ended at both ends, with a space left between the internal wall of the external pipe and the internal pipe of the transparent fluid heating pipe unit. In addition, both ends of these external and internal pipes can be connected to each other and sealed, an electric heater can be arranged in the internal pipe with a space left therebetween and both ends of this electric heater can be supported by supporting members.

The U-shaped electric heater can be housed in the U-shaped space formed by the semispherical fluid heating pipe unit, this fluid heating pipe unit can be arranged in a housing and both ends of the U-shaped electric heater can be supported by the supporting members on the cap provided on this housing.

This configuration allows the removal and replacement of only the electric heater from/into the fluid heater and therefore the fluid need not be removed from the fluid heating pipe unit when the heater is to be replaced, maintenance is facilitated and intrusion of contaminative substances can be prevented.

BRIEF DESCRIPTION OF THE DRAWINGS

FIG. 9(B) is a front view of a cap of the fluid heater of FIG. 8(A), and FIGS. 9(C1) and 9(C2) are respectively a front view and a side view of the ring of the fluid heater of FIG. 8(A)

BEST MODE FOR CARRYING OUT THE INVENTION

The best embodiment of a fluid heater in accordance with the present invention is described in detail below referring to the accompanying drawings.

Figure 1A:
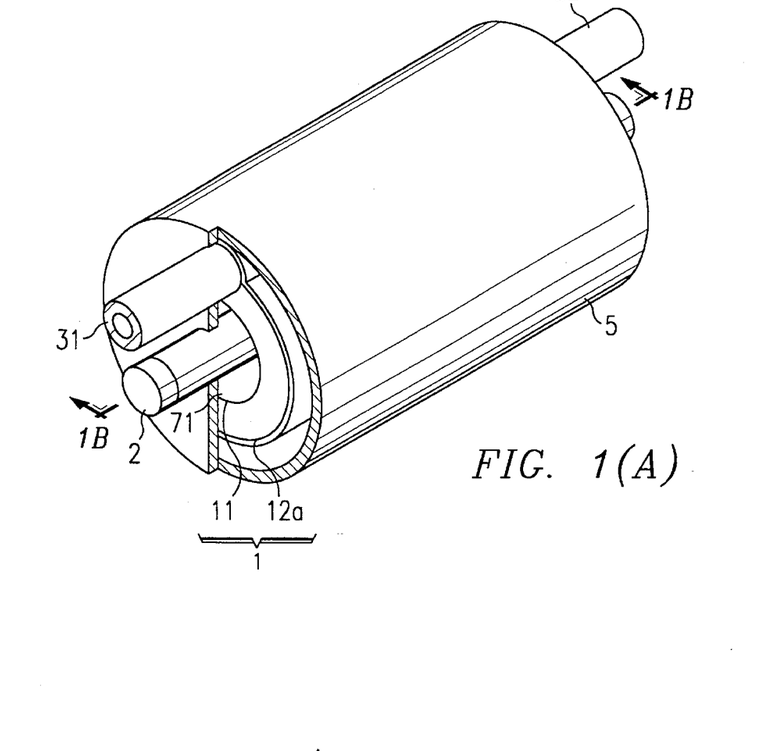
FIG. 1(A) is a perspective view of a fluid heater of the first embodiment in accordance with the present invention and FIG. 1(B) is a sectional view along line 1B—1B of the fluid heater of FIG. 1(A)
Figure 1B:
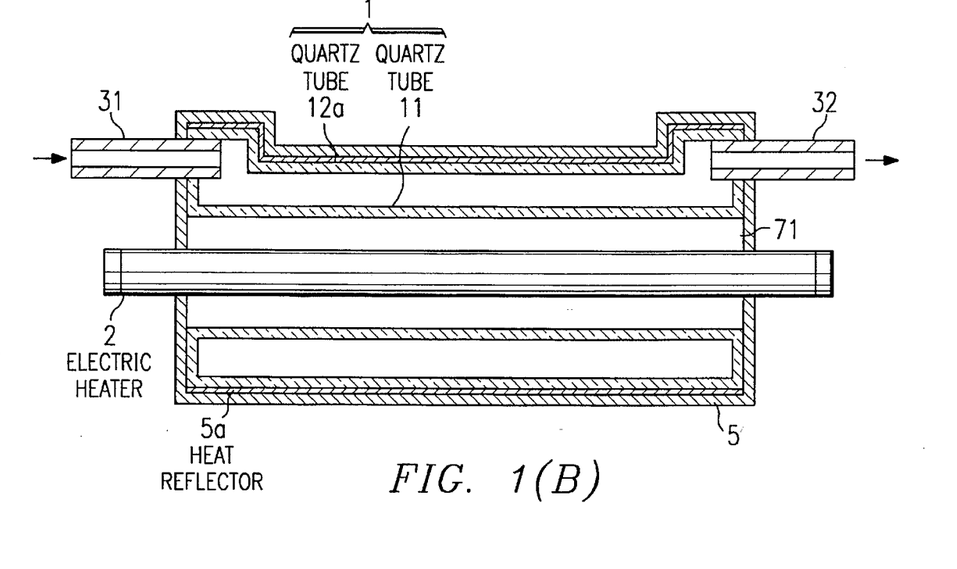

FIG. 1(A) and FIG. 1(B) respectively show the first embodiment of the present invention wherein a fluid heating pipe unit 1 is provided on an external periphery of electric heater 2 and, in addition, a separate inwardly faced reflection member 5, having a gold reflection layer 5a on its interior surface, is mounted about an external periphery of this fluid heating pipe unit 1. This fluid heating pipe unit 1 is roughly formed with internal and external tubes 11, 12, each made of a quartz glass tube. Specifically, the fluid heating pipe unit 1 is provided with a fluid inlet pipe 31 and a fluid outlet pipe 32 at the right and left ends, and the electric heater 2 along the center axis in a space 71 in the internal tube 11. It is confirmed in the experiments by the inventors of the present invention that, though there is air in this space 71, light is rarely absorbed by air and a greater part of radiant heat from the electric heater 2 is radiated into the fluid heating pipe unit 1 to contribute to the heating of the fluid.

Figure 2A:
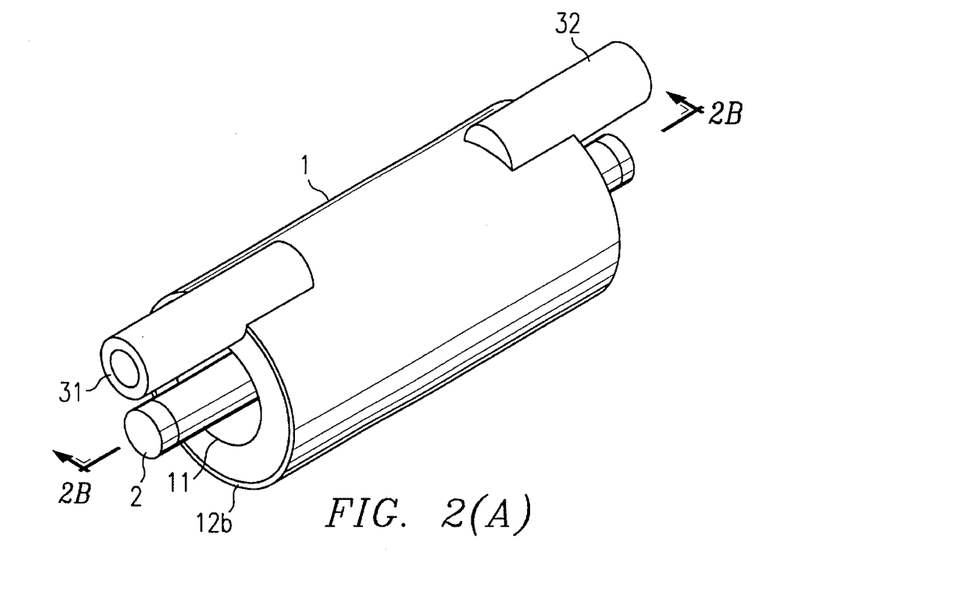
FIG. 2(A) is a perspective view of a fluid heater of the second embodiment in accordance with the present invention and FIG. 2(B) is a sectional view along line 2B—2B of the fluid heater of FIG. 2(A)
Figure 2B:
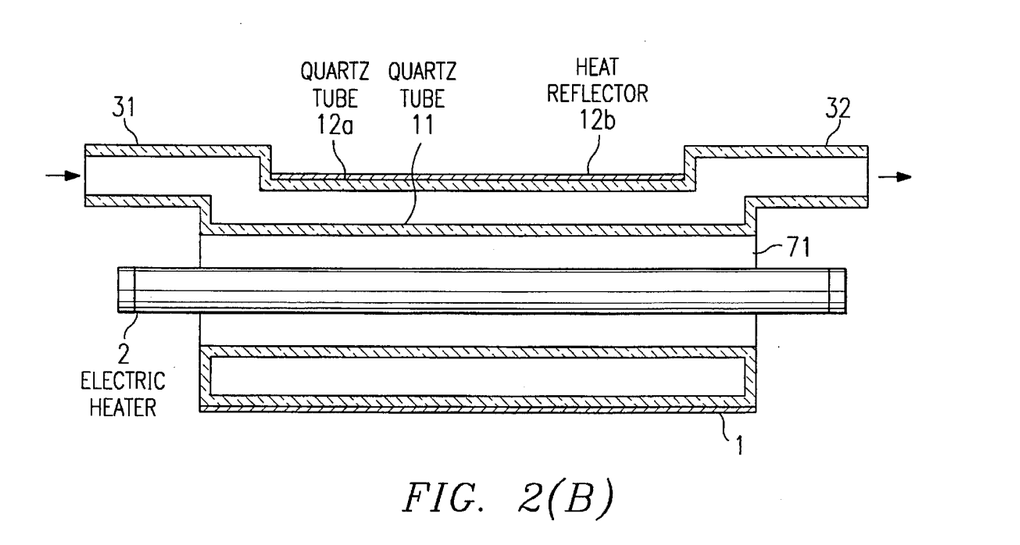

FIGS. 2(A) and 2(B) respectively show a fluid heater according to the second embodiment which is provided with the fluid heating pipe unit 1 on the external periphery of the electric heater 2. Differing from the first embodiment, the separate inwardly faced reflection member 5 is not provided on the external periphery of the fluid heating pipe unit 1, but the inwardly faced reflection member 12b is integrally formed on the outside of the fluid heating pipe unit 1.

Figure 2C:
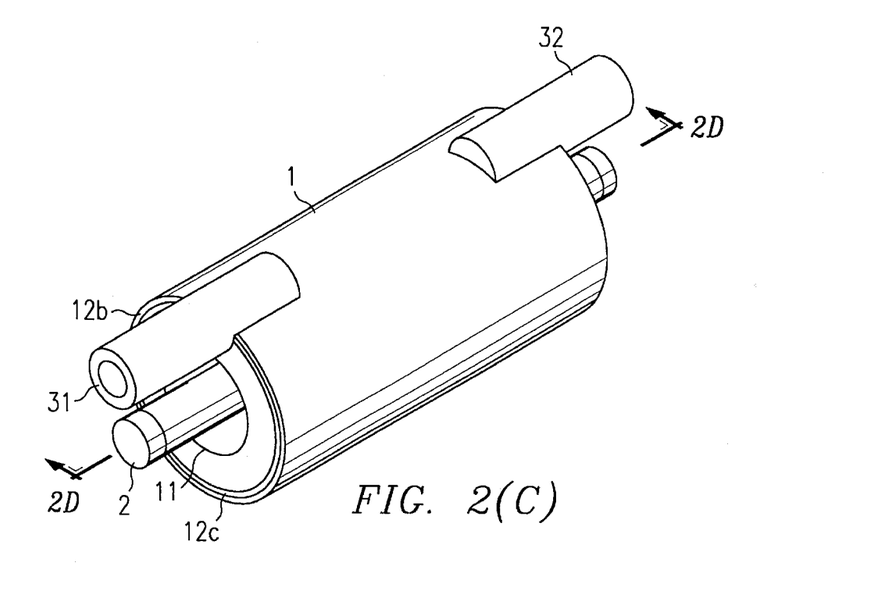
FIG. 2(C) is a perspective view of a fluid heater of the third embodiment in accordance with the present invention and FIG. 2(D) is a sectional view along line 2D—2D of the fluid heater of FIG. 2(C)
Figure 2D:
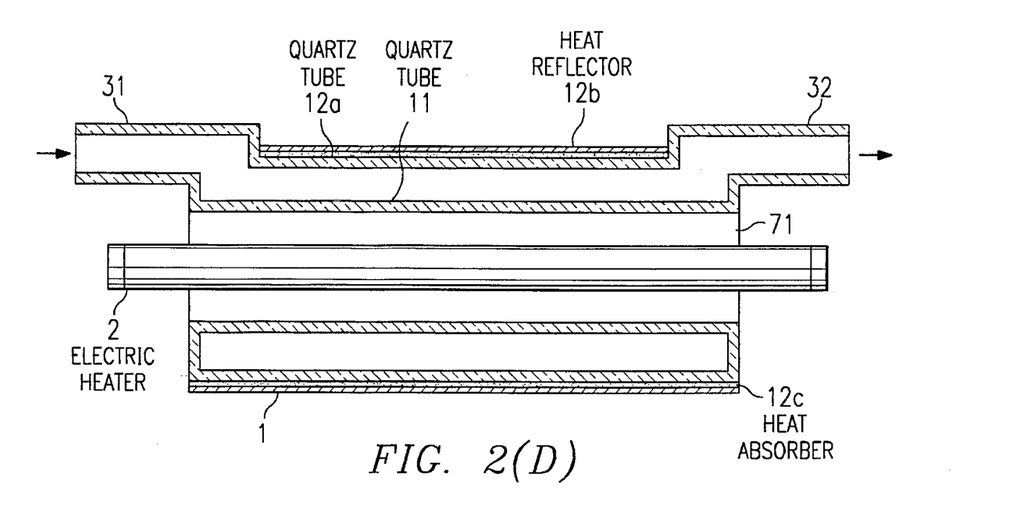

FIGS. 2(C) and 2(D) illustrate the third embodiment, wherein the outside of the fluid heating pipe unit 1 can be formed with a radiant heat absorbing member 12c such as, for example, a black-colored member instead of the inwardly faced reflection member 12b in FIGS. 2(A) and 2(B).

Figure 3A:
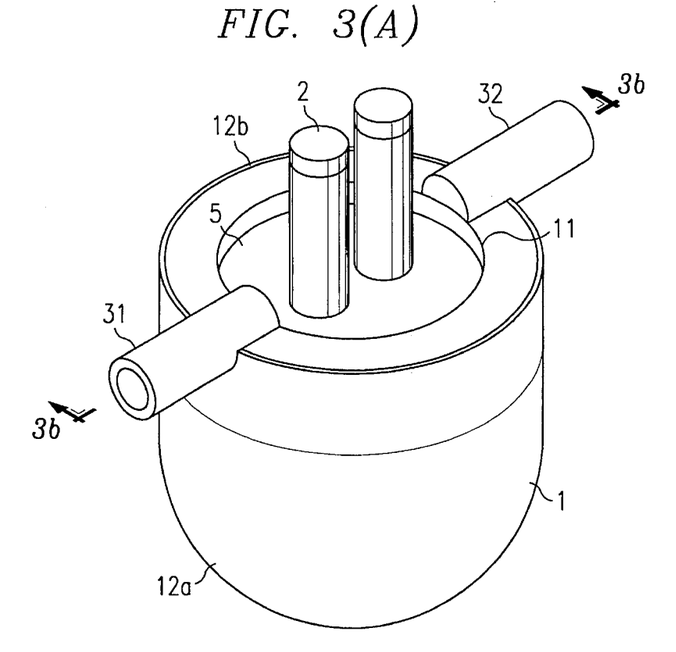
FIG. 3(A) is a perspective view of a fluid heater of the fourth embodiment in accordance with the present invention and FIG. 3(B) is a sectional view along line 3B—3B of the fluid heater of FIG. 3(A)
Figure 3B:
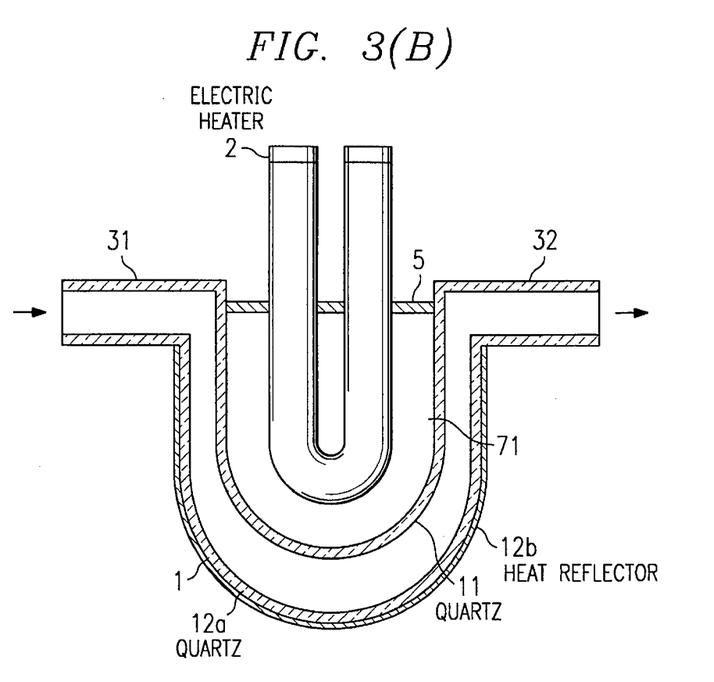

FIGS. 3(A) and 3(B) show the fourth embodiment. The fluid heating pipe unit 1 is semispherically shaped, the electric heater side 11 of the fluid heating pipe unit 1 is formed with transparent material and the outside is coated with a reflection member 12b. The U-shaped electric heater 2 is housed in the semispherical space of the fluid heating tube unit 1 and its upper part is covered with a reflection plate 5.

Figure 3C:
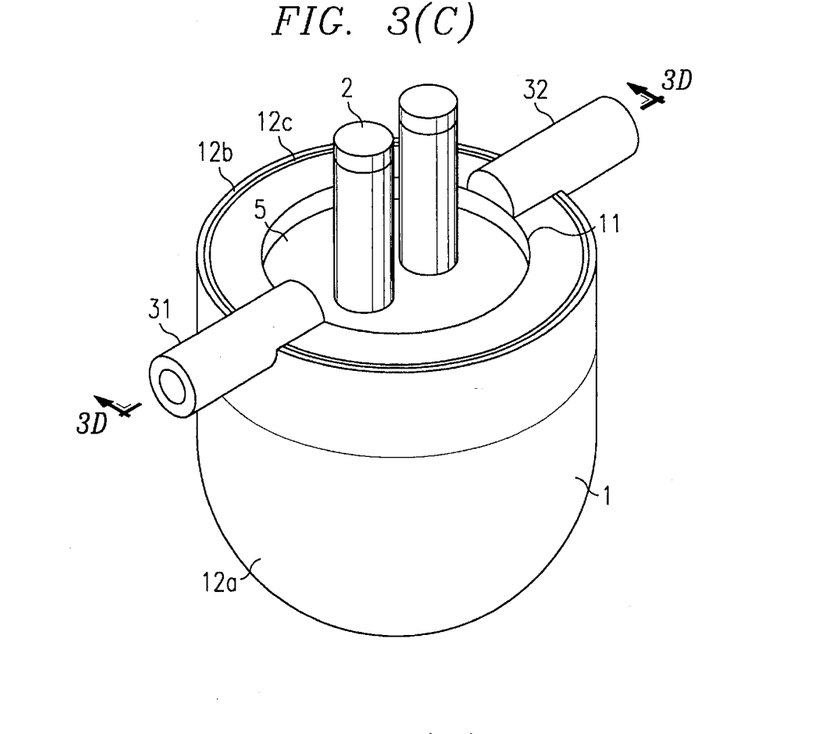
FIG. 3(C) is a perspective view of a fluid heater of a modification of the fourth embodiment in accordance with the present invention and FIG. 3(D) is a sectional view along line 3D—3D of the fluid heater of FIG. 3(C)
Figure 3D:
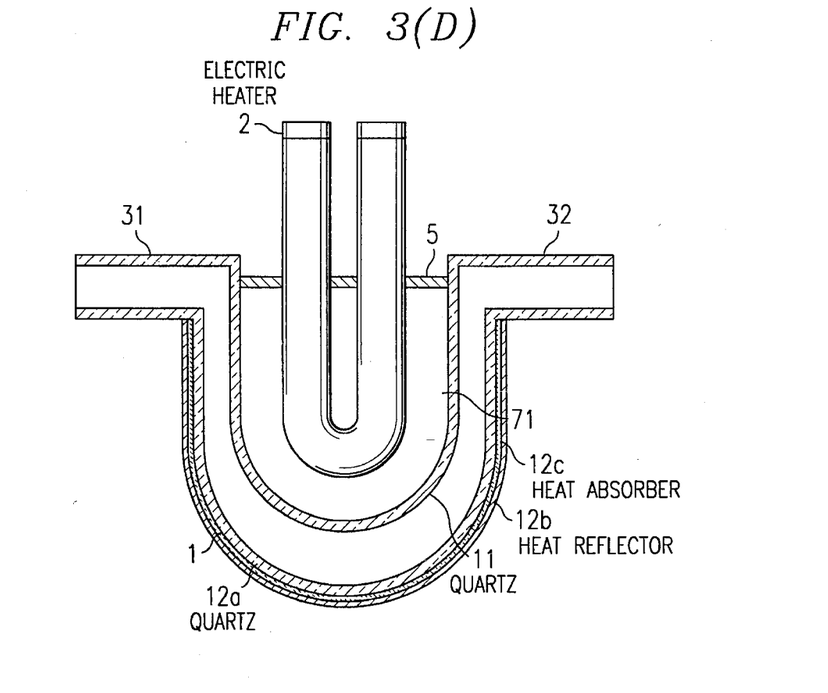

FIGS. 3(C) and 3(D) show a modification of the fourth embodiment. The fluid heating pipe unit 1 is semispherically shaped, the electric heater side 11 of the fluid heating pipe unit 1 is formed with transparent material and the outside is coated with a radiant heat absorbing member 12c. The U-shaped electric heater 2 is housed in the semispherical space of the fluid heating tube unit 1 and its upper part is covered with a reflection plate 5.

Figure 4A:
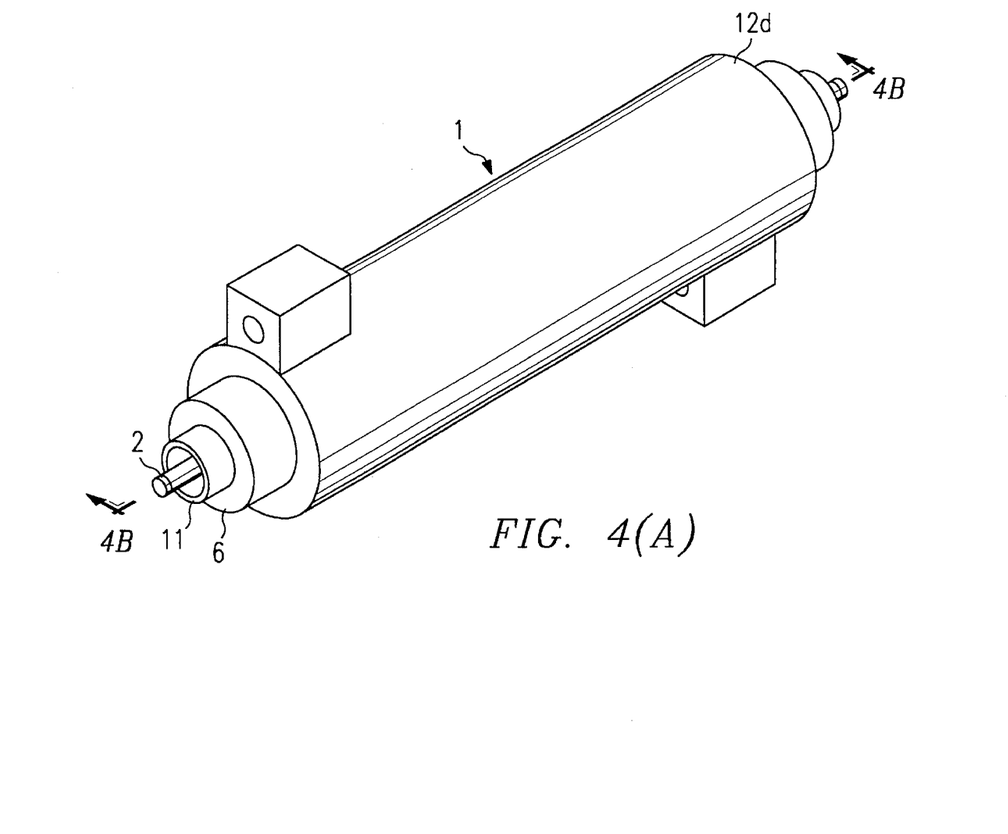
FIG. 4(A) is a perspective view of a fluid heater of the fifth embodiment in accordance with the present invention and FIG. 4(B) is a sectional view along line 4B—4B of the fluid heater of FIG. 4(A)
Figure 4B:
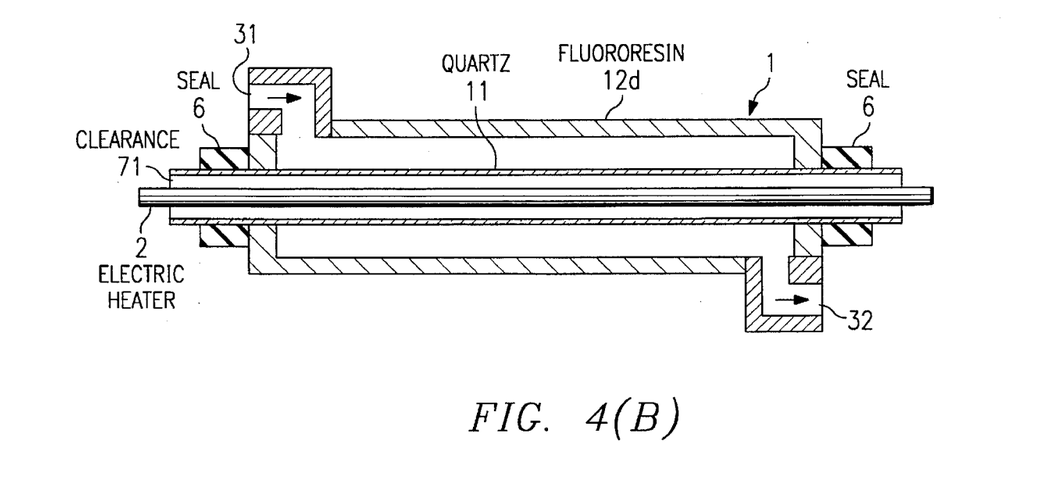

In the fifth embodiment shown in FIGS. 4(A) and 4(B), the electric heater 2 is a quartz glass type infrared ray heater. The fluid heating pipe unit 1 incorporates this quartz glass type infrared ray heater. The fluid heating pipe unit 1 is provided with a quartz glass tube 11 at the quartz glass type infrared ray heater 2 side, an external fluororesin tube 12d and sealing members 6, and the quartz glass tube 11 is fitted-to the holes of the closing walls of both ends of the fluororesin tube 12d with sealing members 6.

Figure 5A:
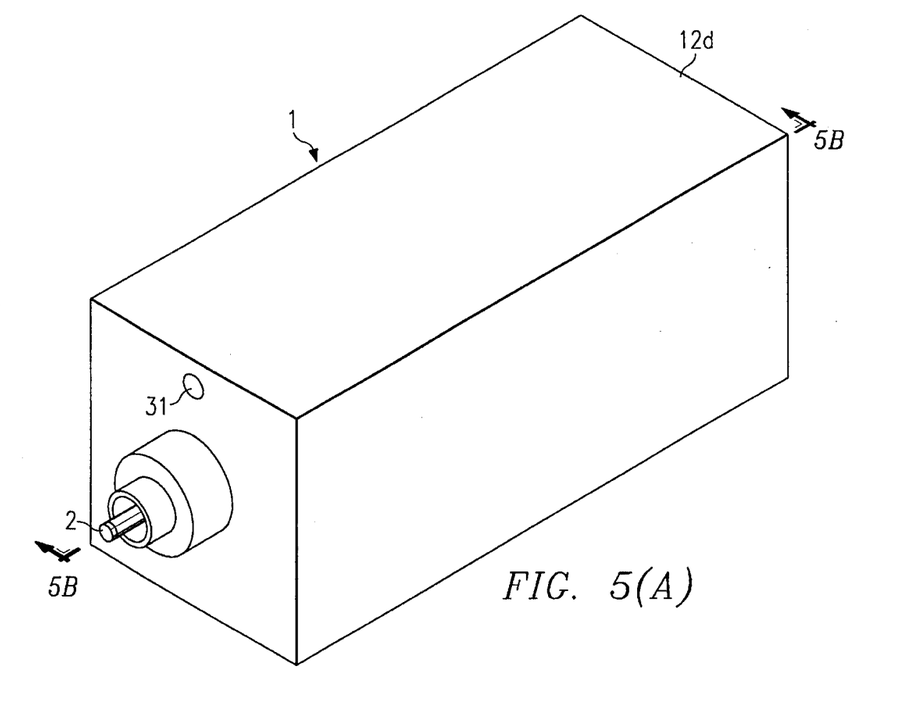
FIG. 5(A) is a perspective view of a fluid heater of the sixth embodiment in accordance with the present invention and FIG. 5(B) is a sectional view along line 5B—5B of the fluid heater of FIG. 5(A)
Figure 5B:
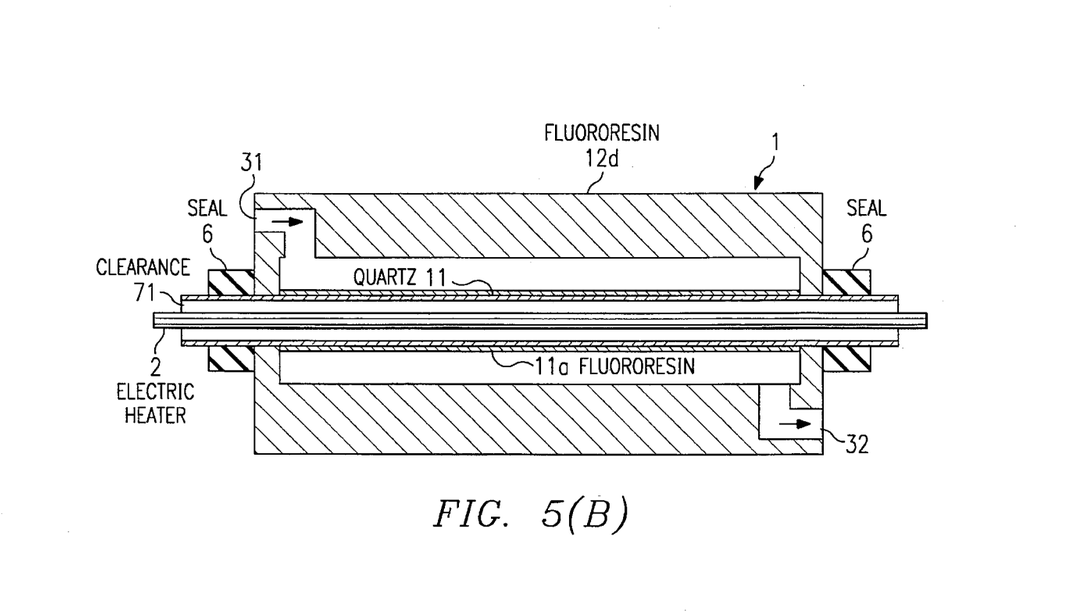

FIGS. 5(A) and 5(B) show the sixth embodiment wherein the outside of the fluid heating pipe unit 1 is square-shaped to improve the stability of the fluid heater itself, though the outside of the fluid pipe unit 1 is cylindrically shaped in the fifth embodiment. Various modes of this outside profile are available because of polygonal cross section.

Since contamination substances adhere to the flow passage if there is unevenness in the flow passage, the surface of the fluororesin tube 12a should be flat. Unevenness appears on the cut surface which is usually made by cutting but the tube 12a can be obtained as an injection-molded product with high flatness free from pin holes by using fluororesin sold with the brand name SAITOP by Asahi Glass Co., Ltd. For a fluid to be heated which is a hydrofluoric acid based reagent, the flow passage should be made of fluororesin. SAITOP fluororesin can be coated on the surface of quartz glass, and the flow passage side surface of the quartz glass tube 11 can be coated with a layer 11a of SAITOP fluororesin. Since the light transmission factor of SAITOP fluororesin from the visible zone to the infrared ray zone is 95–96%, a thin film coating of several hundred angstroms to several ten microns is enabled and simultaneously the coating of SAITOP fluororesin on the flow passage side surface of the quartz glass tube 11 does not hinder transmission of light.

The reflection surfaces of the inwardly faced reflection member 5 shown in the first embodiment can be a gold layer 5a, while the reflection surface of the inwardly faced reflection member in the second embodiment can be a gold layer 12b. These reflection surfaces can be formed by light reflection material such as aluminum, tin oxide, indium, chromium or the like, instead of gold (the seventh and eighth embodiments).

An inwardly reflection member can be additionally provided on the external periphery of the external radiant heat absorbing member 12c shown in the third embodiment and this reflection surface can be formed by gold. Also in this case, the reflection surface can be formed by light reflection material such as aluminum, tin oxide, indium, chromium or the like (the ninth embodiment).

Figures 6A, 7:
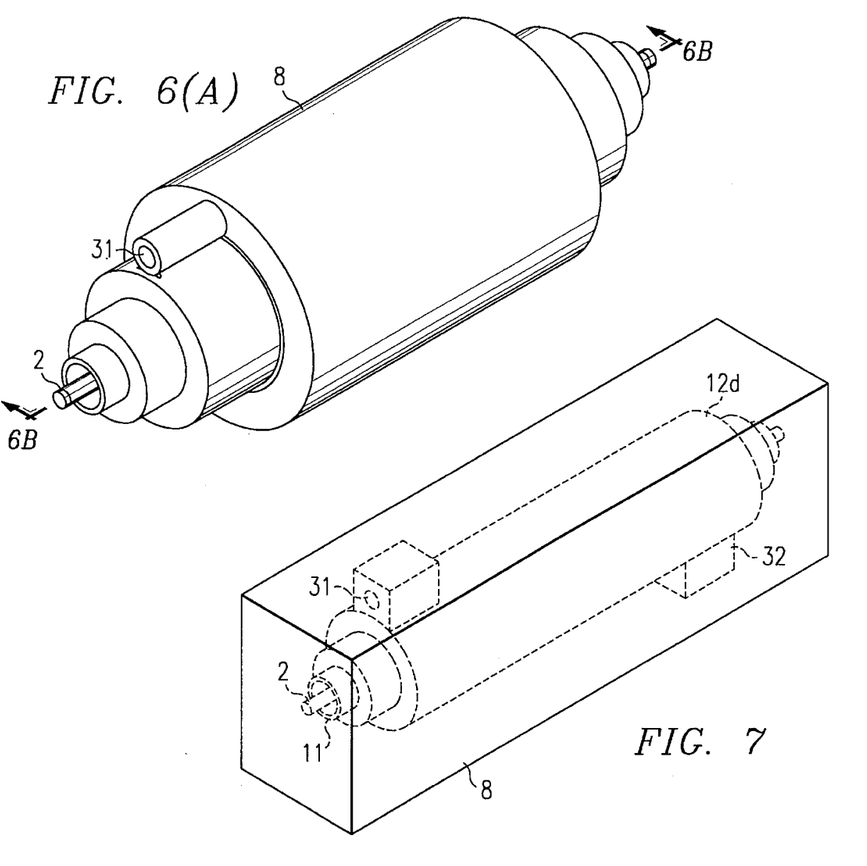
FIG. 6(A) is a perspective view of a fluid heater of the tenth embodiment in accordance with the present invention and FIG. 6(B) is a sectional view along line 6B—6B of the fluid heater of FIG. 6(A)
FIG. 7 is a perspective view of a fluid heater of the eleventh embodiment in accordance with the present invention.
Figure 6B:
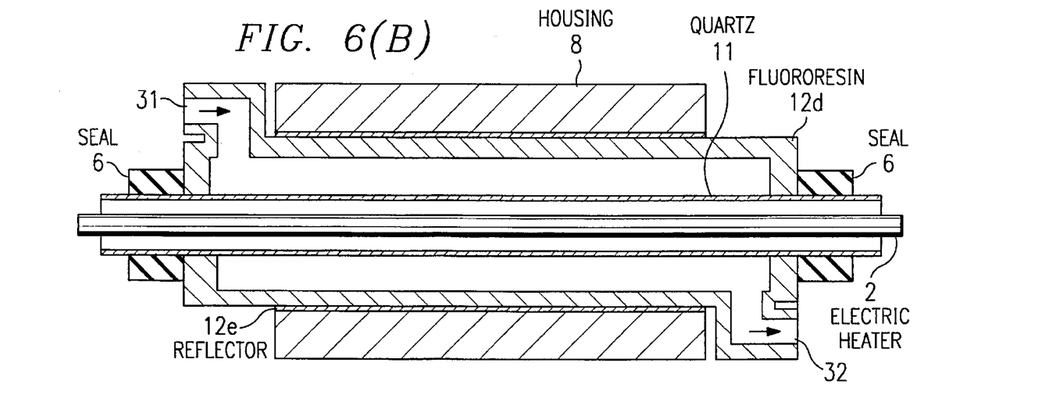

In the tenth embodiment, as shown in FIGS. 6(A) and 6(B), the fluid heater is arranged in the housing 8 which is inwardly covered with light reflection material 12e such as gold, aluminum, tin oxide, indium, chromium or others so that the fluid heater is partly covered. As shown in FIG. 7, the housing can be a complete housing which wholly covers the fluid heater (the 11th embodiment). In this case, "inwardly faced" means that the reflection surface is faced to the inside where the fluid heater is arranged though this covering film is used on the external surface, internal surface or internal and external surfaces.

According to the above embodiments, basically, the fluid heating pipe unit 1 is provided on the external periphery of the electric heater 2 to heat fluid in the fluid heating pipe unit 1.

In case of the conventional fluid heater, a radiant heat component from the external periphery of the electric heater 2 is not radiated to the fluid heating pipe unit 1 and is only radiated to insulation material 4 and therefore it is difficult for this radiant heat component to contribute to heating of fluid. On the contrary, in cases of the above described embodiments, all radiant heat is basically radiated to the fluid heating pipe unit 1 and accordingly high speed heating is carried out. In addition, since insulation material indispensable for the conventional fluid heater is omitted, the required space can be reduced. In other words, a high energy density structure is obtained for the same heating calorie and the radiation receiving area is increased.

In addition, the fluid heating pipe unit 1 is made of quartz glass and fluororesin and therefore anticorrosiveness of the fluid heating pipe unit 1 can be improved. Since the fluororesin tube is made as an injection molded product, its surface can be smoothed to avoid adhesion of fluid and contamination of heated fluid can be reduced.

The electric heater 2 is a quartz glass infrared ray heater, for example, a halogen lamp which provides a filament temperature of 2000 K~3000 K, and can therefore be used at a high temperature approximately two or three times the filament temperature of the nichrome wire, the limit for which is approximately 1000K, and radiation light energy can be increased 16–81 times. The existing reflection surfaces and the reflection surfaces separately provided can be formed by gold, aluminum, tin oxide, indium, chromium or a like material as a light reflection film to prevent penetration of radiant heat to the outside.

In addition to the above, the electric heater 2 and the internal transparent member 11 of the fluid heating pipe unit 1 are disposed opposing each other with a clearance 71 and both ends of the electric heater 2 are remountably fitted to the fluid heating pipe unit 1 with supporting members. This structure is shown in detail in FIGS. 8(A) and 9(A) as the 12th and 13th embodiments.

Figure 8:
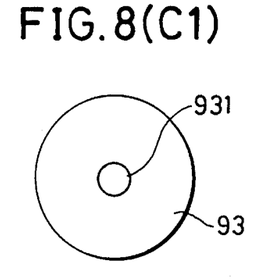
FIG. 8(A) is a sectional view of a fluid heater according to the 12th embodiment.
FIG. 8(B) is a front view of the end part of the electric heater of the fluid heater of FIG. 8(A), FIGS. 8(C1) and 8(C2) are respectively a front view and a side view of a cap of the electric heater of the fluid heater of FIG. 8(A), FIGS. 8(D1) and 8(D2) are respectively a front view and a side view of a first ring of the electric heater of the fluid heater of FIG. 8(A), FIGS. 8(E1) and 8(E2) are respectively a front view and a side view of a second ring of the electric heater of the fluid heater of FIG. 8(A)
Figure 8A:
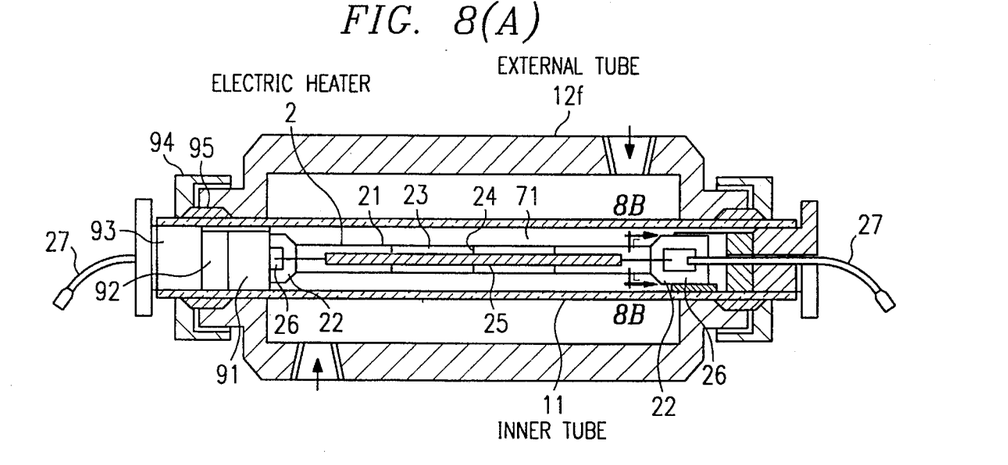

In FIG. 8(A), the electric heater 2 is a halogen lamp. In the quartz glass tube 21 having both ends formed to be flat after melting and cooling, a halogen element, inactive gas 23, and a tungsten filament coil 25 supported by a plurality of anchors 24 are sealed. A molybdenum foil 26 is sealed inside each end 22, and the filament coil 25 and a lead 27 inserted from the outside are connected to this molybdenum foil 26. The details of the electric heater 2 and coupling of internal tube 11 and external tube 12*f* are as described below.

Figure 8B:
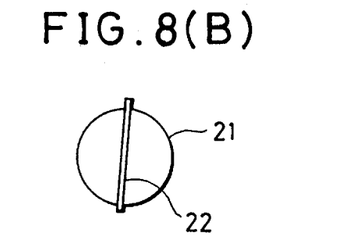

The coupling relationship of the electric heater 2 and the internal tube 11 is shown. The internal tube 11 incorporates the electric heater 2 and ceramic rings 91 and 92, serving as supporting members, in sequence from the center and capped with silicone rubber bushes 93. Both ends 22 shown in FIG. 8(B) of the electric heater 2 are inserted into recesses 911 of the ceramic rings 91 shown in FIGS. 8(E1) and 8(E2). Leads 27 are connected to an external power supply through the recesses 921 of ceramic rings 92 shown in FIGS. 8(D1) and 8(D2) and through holes 931 of silicone rubber bushes 93 shown in FIG. 8(C1) and 8(C2). Ceramic rings 91 and 92 are used to provide a certain amount of clearance in the lengthwise direction of the internal tube 11 and also in the radial direction while the electric heater 2 is housed in the internal tube 11. Therefore, ceramic rings 91 and 92 are loosely inserted into the internal tube 11 as shown in FIG. 8(A). A difference of thermal expansion between the electric heater 2 and the internal tube 11 is absorbed by the above described clearance.

The coupling relationship of the internal tube 11 and the external tube 12*f* is shown. A member 94 providing a hole through which the internal tube 11 is inserted at the center and a ferrule 95 to be used between the internal tube 11 and the external tube 12*f* are prepared. A female thread is provided at one end of the member 94 and a male thread is provided on both ends of the external tube 12*f*. The internal tube 11 and the electric heater 2 are fixed to the external tube 12*f* by fitting the ferrule 95 into the groove of external tube 12*f* and thread-fitting the member 94 to the external tube 12*f*. The ferrule 95 is made of thermal resistant fluororesin and serves to seal fluid to be heated and absorb the difference of thermal expansion of internal and external tubes 11 and 12*f*.

According to the above embodiment, the electric heater 2 is remountably inserted into the internal tube 11 and therefore fluid (chemical solution) need not be removed from the fluid heating pipe unit 1 when the electric heater 2 is to be replaced, maintenance services are facilitated and intrusion of contamination substances into the flow passage can be prevented. In addition, fluid to be heated is not directly exposed to a high temperature electric heater 2 and therefore thermal impact to the electric heater 2 can be reduced and its longer service life can be ensured. The service life relates to the filament temperature, and the specified values are 3000 hours for 2800K and 1500 hours for 3000K and the cycle of replacement is once per 0.5~1 year. A plurality of electric heaters are often used and the cycle of replacement will be further lengthened.

Figure 9A:
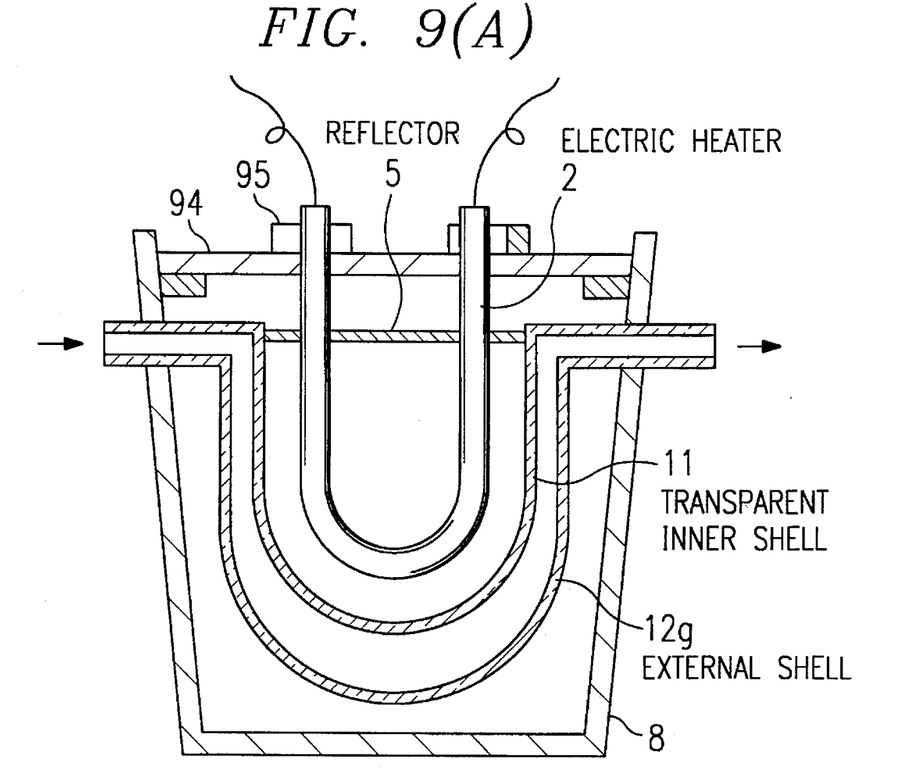
FIG. 9(A) is a sectional view of a fluid heater according to the 13th embodiment.

In case of the U-shaped electric heater, the fluid heater is arranged in the housing 8 as shown in FIG. 9(A). The U-shaped electric heater 2 is fitted into the groove 951 of the rubber ring 95 via the through hole of the reflection plate 5 and the through hole 941 of the cap 94, and the ring 95 is fitted to the cap 94 with bolt 952. Also in this case, the electric heater 2 is easily remountable and inserted with a play owing to the elasticity of the rubber ring 95 serving as a supporting member and therefore thermal expansion of the electric heater 2 is absorbed and will not be damaged due to local load resulting from thermal expansion. This embodiment can apply to a pot for potable water.

INDUSTRIAL APPLICABILITY

The present invention provides a useful fluid heater capable of having a high energy density structure and an increased radiation receiving area, facilitating maintenance services and preventing intrusion of contamination substances. Particularly, the fluid heater in accordance with the present invention is excellent as a fluid heater capable of appropriately carrying out heating and temperature control, such as heating and temperature control of etching solution and resist removing solution after cleaning wafers made of silicon or the like in processes for manufacturing semiconductor devices, and heating and temperature control of oils for foodstuffs while the fluid to be heated is being supplied.

What is claimed is:

1. A fluid heating device comprising:

a transparent annular inner wall forming an internal space for receiving an infrared radiation heating member, said transparent annual inner wall having first and second open ends;

an annular outer wall spaced outwardly from said transparent annular inner wall to form a fluid passageway therebetween;

an infrared radiation heating member removably positioned in said internal space so that said infrared radiation heating member can be removed from said fluid heating device without requiring that said fluid passageway be opened; said infrared radiation heating member, when positioned in said internal space, being spaced from said transparent annular inner wall to form a clearance between said infrared radiation heating member and said transparent annular inner wall such that said infrared radiation heating member is at least partially surrounded by said transparent annular inner wall while avoiding direct contact between said infrared radiation heating member and said transparent annular inner wall; and a radiation reflection member positioned on the exterior of said annular outer wall so as to reflect infrared radiation, which has passed from said infrared radiation heating member through said transparent annular inner wall, said fluid passageway, and said annular outer wall, back through said annular outer wall into said fluid passageway.

2. A fluid heating device comprising:

a transparent annular inner wall forming an internal space for receiving an infrared radiation heating member;

an annular outer wall spaced outwardly from said transparent annular inner wall to form a fluid passageway therebetween;

an infrared radiations heating member removably positioned in said internal space so that said infrared radiation heating member can be removed from said fluid heating device without requiring that said fluid passageway be opened; said infrared radiation heating member, when positioned in said internal space, being spaced from said transparent annular inner wall such that said infrared radiation heating member is at least partially surrounded by said transparent annular inner wall while avoiding direct contact between said infrared radiation heating member and said transparent annular inner wall; and a radiation reflection member positioned on the exterior of said annular outer wall so as to reflect infrared radiation, which has passed from said infrared radiation heating member through said transparent annular inner wall, said fluid passageways, and said annular outer wall, back through said annular outer wall into said fluid passageway;

wherein said transparent annular inner wall is formed in an approximately semispherical shape with a concave recess therein; and wherein said infrared radiation heating member is U-shaped with at least a portion thereof being positioned in said concave recess.

3. A fluid heating device in accordance with claim 2, further comprising a reflection plate to close said concave recess.

4. A fluid heating device in accordance with claim 2, further comprising a housing enclosing said transparent annular inner wall and said annular outer wall, and an elastic supporting member on said housing for supporting both ends of said U-shaped infrared radiation heating member.

5. A fluid heating device in accordance with claim 1, further comprising first and second supporting members loosely positioned within the internal space of said transparent annular inner wall with said first supporting member being positioned adjacent said first open end and said second supporting member being positioned adjacent said second open end, said first and second supporting members supporting said infrared radiation heating member therebetween, said first and second supporting members providing clearance in the lengthwise direction of said transparent annular inner wall as well as clearance in the radial direction while the infrared radiation heating member is positioned within said internal space of said transparent annular inner wall, and further comprising a first cap closing said first open end and a second cap closing said second open end.

6. A fluid heating device in accordance with claim 1, wherein said infrared radiation heating member has first and second ends and a greater axial length than said transparent annular inner wall such that said first and second ends of said infrared radiation heating member extend outwardly from said first and second open ends of said transparent annular inner wall, and wherein said infrared radiation heating member can be removed from said fluid heating device through either of said first and second open ends of said transparent annular inner wall.

7. A fluid heating device comprising:

a transparent annular inner wall forming an internal space for receiving an infrared radiation heating member, said transparent annular inner wall having first and second open ends;

an annular outer wall spaced outwardly from said transparent annular inner wall to form a fluid passageway therebetween; and a quartz glass tube type infrared radiation heating member removably positioned in said internal space so that said quartz glass tube type infrared radiation heating member can be removed from said fluid heating device without requiring that said fluid passageway be opened; said quartz glass tube type infrared radiation heating member, when positioned in said internal space, being spaced from said transparent annular inner wall to form a clearance between said quartz glass tube type infrared radiation heating member and said transparent annular inner wall such that said quartz glass tube type infrared radiation heating member is at least partially surrounded by said transparent annular inner wall while avoiding direct contact between said quartz glass tube type infrared radiation heating member and said transparent annular inner wall; and wherein said annular outer wall reflects infrared radiation, which has passed from said quartz glass tube type infrared radiation heating member through said internal space, said transparent annular inner wall, and said fluid passageway, back into said fluid passageway.

8. A fluid heating device comprising:

a transparent annular inner wall forming an internal space for receiving an infrared radiation heating member;

an annular outer wall spaced outwardly from said transparent annular inner wall to form a fluid passageway therebetween; and a quartz glass tube type infrared radiation heating member removably positioned in said internal space so that said quartz glass tube type infrared radiation heating member can be removed from said fluid heating device without requiring that said fluid passageway be opened; said quartz glass tube type infrared radiation heating member, when positioned in said internal space, being spaced from said transparent annular inner wall such that said quartz glass tube type infrared radiation heating member is at least partially surrounded by said transparent annular inner wall while avoiding direct contact between said quartz glass tube type infrared radiation heating member and said transparent annular inner wall;

wherein said annular outer wall reflects infrared radiation, which has passed from said quartz glass tube type infrared radiation heating member through said internal space, said transparent annular inner wall, and said fluid passageway, back into said fluid passageway;

wherein said transparent annular inner wall is formed in an approximately semispherical shape with a concave recess therein; and wherein said quartz glass tube type infrared radiation heating member is U-shaped with at least a portion thereof being positioned in said concave recess.

9. A fluid heating device in accordance with claim 8, further comprising a reflection plate to close said concave recess.

10. A fluid heating device in accordance with claim 8, further comprising a housing enclosing said transparent annular inner wall and said annular outer wall, and an elastic supporting member on said housing for supporting both ends of said U-shaped quartz glass tube type infrared radiation heating member.

11. A fluid heating device in accordance with claim 7, further comprising first and second supporting members loosely positioned within the internal space of said transparent annular inner wall with said first supporting member being positioned adjacent said first open end and said second supporting member being positioned adjacent said second open end, said first and second supporting members supporting said quartz glass tube type infrared radiation heating member therebetween, said first and second supporting members providing clearance in the lengthwise direction of said transparent annular inner wall as well as clearance in the radial direction while the quartz glass tube type infrared radiation heating member is positioned within said internal space of said transparent annular inner wall, and further comprising a first cap closing said first open end and a second cap closing said second open end.

12. A fluid heating device in accordance with claim 7, wherein said quartz glass tube type infrared radiation heating member has first and second ends and a greater axial length than said transparent annular inner wall such that said first and second ends of said quartz glass tube type infrared radiation heating member extend outwardly from said first and second open ends of said transparent annular inner wall, and wherein said quartz glass tube type infrared radiation heating member can be removed from said fluid heating device through either of said first and second open ends of said transparent annular inner wall.

13. A fluid heating device comprising:

a transparent annular inner wall forming an internal space for receiving an infrared radiation heating member;

a quartz glass tube type infrared radiation heating member positioned in said internal space and spaced from said transparent annular inner wall such that said quartz glass tube type infrared radiation heating member is at least partially surrounded by said transparent annular inner wall; and an annular outer wall spaced outwardly from said transparent annular inner wall to form a fluid passageway therebetween, said annular outer wall absorbing infrared radiation, which has passed from said quartz glass tube type infrared radiation heating member through said internal space, said transparent annular inner wall, and said fluid passageway, and heating fluid in said fluid passageway by conduction;

wherein said transparent annular inner wall is formed in an approximately semispherical shape with a concave recess therein, and wherein said infrared radiation heating member is U-shaped with at least a portion thereof being positioned in said concave recess.

14. A fluid heating device in accordance with claim 13, further comprising a housing enclosing said transparent annular inner wall and said annular outer wall, and an elastic supporting member on said housing for supporting both ends of said U-shaped infrared radiation heating member.

\* \* \* \* \*